J. B. BARRETT.
MEANS FOR INDICATING THE POSITION OF SELF PROPELLED VESSELS.
APPLICATION FILED MAR. 14, 1917.

1,252,877.

Patented Jan. 8, 1918.
4 SHEETS—SHEET 1.

J. B. BARRETT.
MEANS FOR INDICATING THE POSITION OF SELF PROPELLED VESSELS.
APPLICATION FILED MAR. 14, 1917.
1,252,877.
Patented Jan. 8, 1918.
4 SHEETS—SHEET 2.
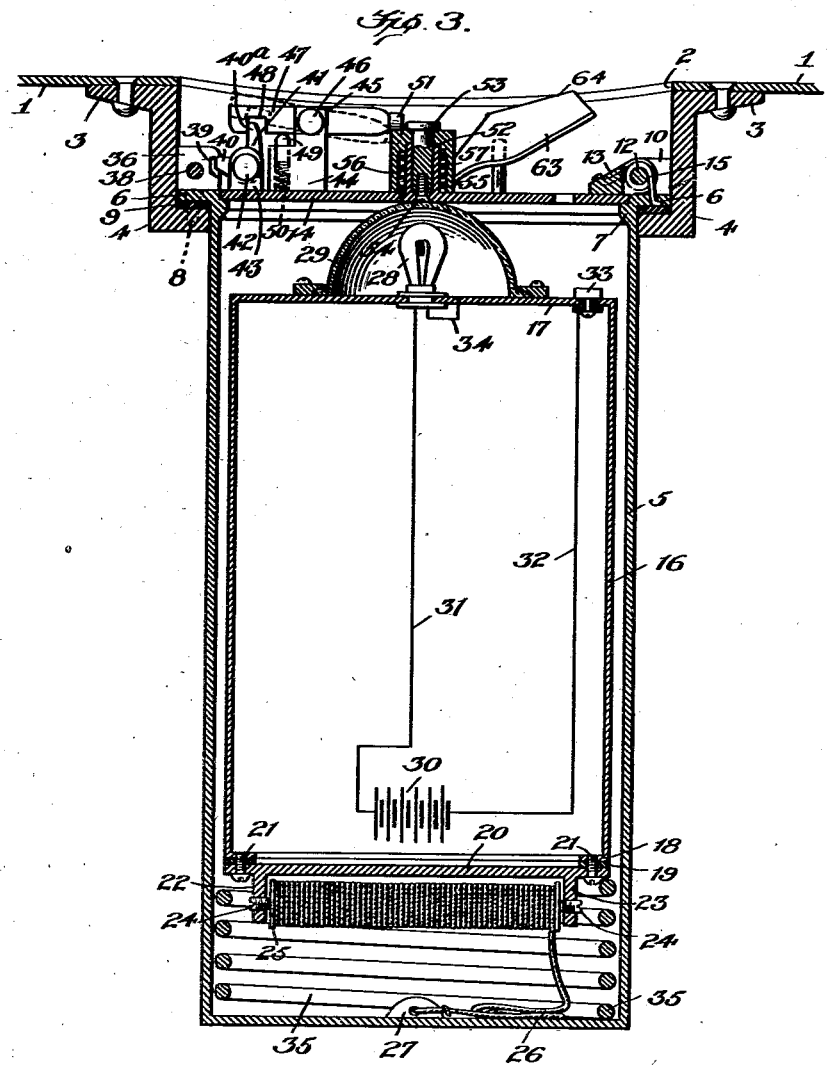
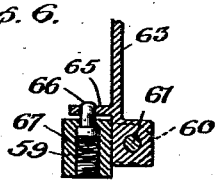

J. B. BARRETT.
MEANS FOR INDICATING THE POSITION OF SELF PROPELLED VESSELS.
APPLICATION FILED MAR. 14, 1917.

1,252,877.

Patented Jan. 8, 1918.
4 SHEETS—SHEET 3.

J. B. BARRETT.
MEANS FOR INDICATING THE POSITION OF SELF PROPELLED VESSELS.
APPLICATION FILED MAR. 14, 1917.
1,252,877.
Patented Jan. 8, 1918.
4 SHEETS—SHEET 4.
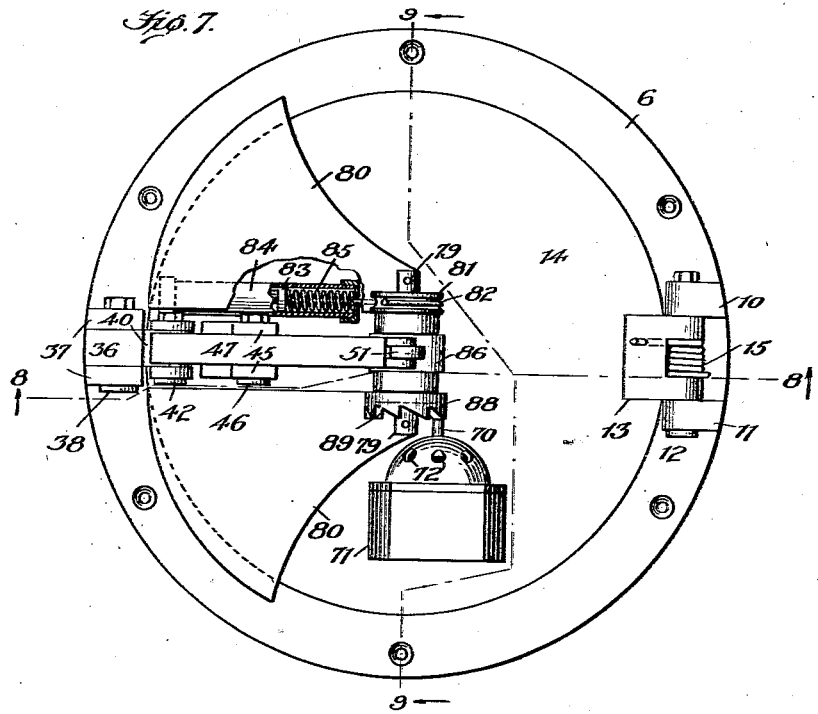
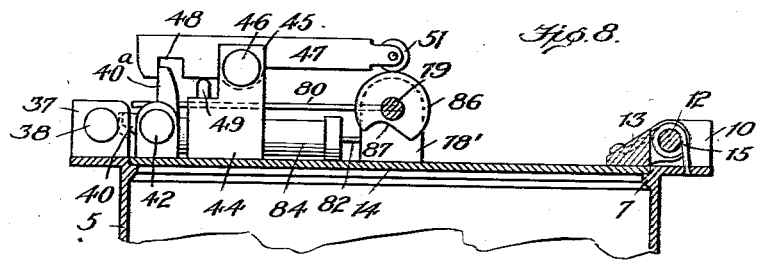
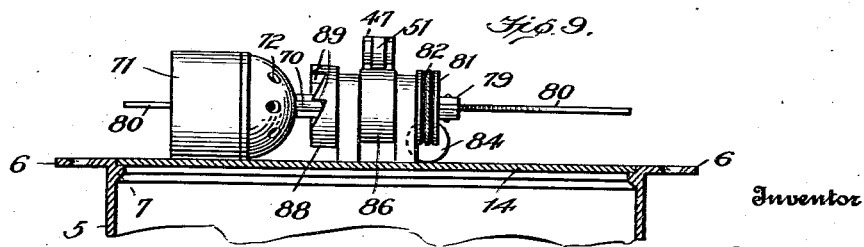

UNITED STATES PATENT OFFICE.

JOHN B. BARRETT, OF CLIFTON STATION, VIRGINIA.

MEANS FOR INDICATING THE POSITION OF SELF-PROPELLED VESSELS.

1,252,877.  Specification of Letters Patent.  Patented Jan. 8, 1918.

Application filed March 14, 1917. Serial No. 154,838.

*To all whom it may concern:*

Be it known that I, JOHN B. BARRETT, a citizen of the United States, residing at Clifton Station, in the county of Fairfax and State of Virginia, have invented certain new and useful Improvements in Means for Indicating the Position of Self-Propelled Vessels; and I do hereby declare the following to be a full, clear, and exact description of the same, reference being had to the accompanying drawings, forming part of this specification.

This invention relates generally to means for indicating the final resting place of a self-propelled vessel, for example, an automobile torpedo, particularly when used for practice firing, whereby persons stationed either on shore or on a surface vessel may readily ascertain the position of the torpedo and thus recovery of the torpedo is made a comparatively simple matter.

In my co-pending application filed September 11, 1916, Serial No. 119,540, there is illustrated and described a releasable indicating means, preferably a buoy normally carried by a vessel of the type above specified and adapted, when released, to indicate the final resting position of the vessel. The present improvements relate more particularly to an improved mechanism for retaining the indicating means on the vessel and for releasing the latter at the proper time, and the primary object in view is the provision of an exceedingly simple and efficient mechanism for this purpose, which will not offer any resistance to the motion of the vessel through the water, or in any manner operate to deflect the vessel from its proper course, or, in the case of a torpedo, interfere with firing of the latter through a tube.

The improvements of this invention are readily adapted for use in connection with the indicating means and other parts set forth in my said co-pending application and are, therefore, conveniently illustrated herein in connection with indicating means and other parts of the same nature. It will be understood, however, that features of the invention herein are not necessarily limited to the specific application described and illustrated.

For a full understanding of the invention reference is made to the ensuing detailed description, when taken in connection with the accompanying drawings which illustrate a structural embodiment of the invention in a preferred form. The novel features of the invention will be particularly pointed out and specified in the claims at the end of the specification.

In the drawings:

Fig. 3 is a vertical sectional elevation through the chamber and skin of the torpedo head, showing the parts in the same position which they occupy in Fig. 2.

Fig. 6 is a detail sectional view of the water wing or blade and its supporting arm.

Fig. 7 is a plan view looking downwardly on the chamber or well, illustrating a modified form of lock-controlling mechanism.

Fig. 8 is a vertical sectional elevation on the line 8—8 of Fig. 7.

Fig. 9 is a vertical sectional elevation on the line 9—9 of Fig. 7.

Like characters of reference in the several figures indicate the same parts.

Figure 1:
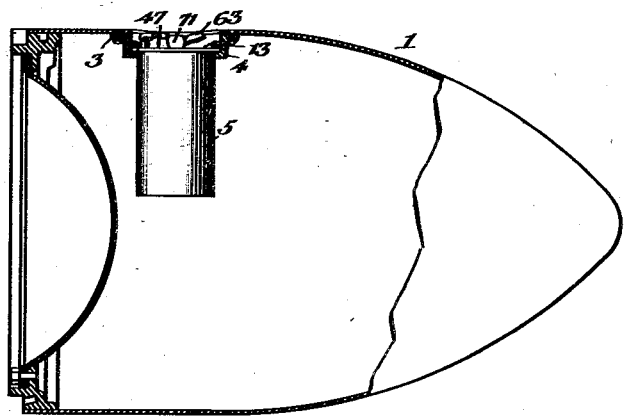
Figure 1 is a vertical sectional elevation of the head of a torpedo of the usual variety provided with the present improvements.

In all forms of the invention illustrated in the drawings, the head of a practice torpedo is indicated by the hull or skin 1 usually constructed of metal and sealed against the entrance of water. The rearward or aft portion of the torpedo may be of any preferred construction provided with means for propelling the vessel through the water. As the construction of the torpedo itself and the propelling means forms no part of the present invention, it is not deemed necessary to illustrate the same herein. At some convenient point on the upper face of the torpedo, the hull or skin 1 is cut away to provide a circular opening 2, beneath which is rigidly secured to the inner face of the skin directly surrounding the opening, a ring 3, having an inwardly and laterally projecting annular flange 4.

This flange 4 forms a seat for a tubular chamber or well 5, as shown in Fig. 3, the bottom of the chamber 5 is closed, while the upper end thereof is open and is provided with a laterally, outwardly extending flange 6 adapted to engage the flange 4 when the chamber is seated within the torpedo head. The chamber or well 5 is further provided with an inwardly and laterally extending annular flange 7 located adjacent the upper end of said chamber, and for a purpose which will appear hereinafter. As stated, the flange 6 is designed to seat on the flange 4 of the ring 3, and the two flanges are securely fastened together by suitable screws or other devices 8. In order to prevent water from entering the head between the flanges 4, 6, a rubber ring 9 or other suitable washer is interposed between said flanges, as shown in Fig. 3.

Figure 2:
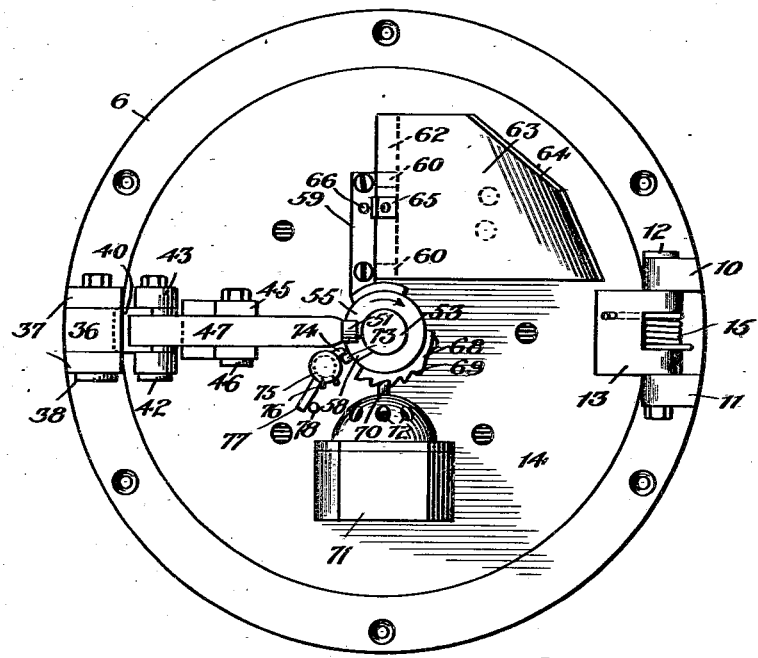
Fig. 2 is an enlarged plan view looking downwardly on the chamber or well, showing the parts of the lock controlling mechanism in normal position.

Mounted on or formed integrally with the flange 6 of the chamber 5 are spaced uprights 10, 11 (Fig. 2) which mutually support a horizontal pin 12 (Fig. 3). On the pin 12 is pivoted the hinge 13 of a cover 14. The latter preferably consists of a circular metallic plate; and, when closed, is adapted to seat on the inwardly projecting flange 7 located at the upper end of the chamber 5. Normally, it is intended that the cover 14 close the open upper end of chamber 5 and for this purpose a lock is provided, which will be hereinafter described. In order to open the cover 14 quickly, when the lock is released, there is provided a spring tensioned to throw the cover into open position. Said spring 15 is coiled around the horizontal pin 12; one end of the spring is secured to the hinge 13 and the other end thereof to some fixed part of the structure, for example, the lateral flange 6, as shown in Figs. 2 and 3.

The chamber 5 is intended for the purpose of receiving and confining the indicator, which, in the present instance, is a buoyant attachment normally carried by the vessel, but released when the motive power of the wheel is spent and the vessel submerges a predetermined depth beneath the surface of the water, in a manner hereinafter set forth. In its preferred embodiment, the indicator consists of a hollow cylinder 16 having its upper end 17 closed, as shown in Fig. 3. At its lower end, the cylinder 16 is formed with an inwardly projecting lateral flange 18 constituting a seat against which an intermittent washer 19 and a bottom closure plate 20 are clamped by means of screws or other suitable attaching devices 21. As so constructed, the cylinder 16 is substantially water tight, and being hollow and of less specific gravity than the water which it displaces, the cylinder will rise to the surface of the water and float thereon when released from its confinement within the chamber 5.

The bottom closure plate 20 is formed with depended spaced brackets 22, 23, which are respectively provided with screw-studs 24 set in alinement with each other. These studs 24 constitute supports for the opposite ends of a reel 25 on which is secured and wound a rope or cable 26. The free end of said cable may be looped within the eye of and secured to a lug 27 mounted on the bottom of chamber 5, whereby the cylinder 16 will remain attached to the vessel, after the cylinder is released and it rises to the surface of the water. Release of the cylinder, of course, unwinds the cable 26 and the latter is made long enough to permit the cylinder to reach the surface of the water from any desired depth of the vessel, if the latter sinks.

In order to indicate the final resting position of the vessel by night, or in thick weather, the indicator cylinder 16 may be provided with a light. As shown in Fig. 3, an electric lamp 28 is mounted in the top 17 of the cylinder beneath a protecting globe 29 secured to the top 17 in any suitable manner. Current for lighting the lamp is supplied by a battery 30 having the line wires 31 and 32. Line wire 31 extends to one of the lamp terminals and line 32 to a terminal 33 mounted in the top 17 of the cylinder. The circuit through the lamp is completed by top 17 and a short wire 34 connecting top 17 with the other lamp terminal.

Within the chamber 5 and beneath the indicator cylinder 16, is a large coil spring 35, adapted to engage the bottom closure plate 20 of the cylinder, and held under tension by the cylinder, when the latter is confined in the chamber and the cover 14 is closed. The spring 35 is made strong enough to eject the indicator cylinder from the chamber 5 when the lock for retaining the cover 14 closed is released, permitting the cover 14 to open. Opening movement of the cover is assisted by the spring 15. On its release from the chamber 5, the indicator cylinder may rise to the surface of the water, thereby designating the submerged position of the vessel.

The lock for retaining the cover 14 closed in order to confine the indicator cylinder within chamber 5 is constructed, preferably as follows:—Mounted on the flange 6 of the chamber 5 is a fixed locking member 36. This locking member 36 is positioned between uprights 37 fixed to the flange 6, and secured to said fixed uprights by a horizontal pin 38 passing through the locking member and the fixed uprights. The fixed locking member 36 is formed with an undercut locking edge 39 (see Fig. 3) adapted to be engaged by the horizontal locking arm 40 of a pivoted locking member 41. Locking member 41 is in the form of a bell crank movable about the axis of a horizontal pin 42 supported by fixed uprights 43 projecting from the cover 14. Also mounted on cover 14 is a support 44 having spaced uprights 45 which mutually support the horizontal pivot pin 46 of an arm 47. Near one end thereof, arm 47 is formed with a notch 48 adapted to receive the upper end of the vertical arm 40ᵃ of the pivoted locking member 41. When arm 47 is in horizontal position, as shown in Fig. 3, the end of vertical arm 40ᵃ enters the notch 48 and horizontal arm 40 of the pivoted locking member is held in engagement with the undercut locking edge 39 of the fixed locking member 36, and the cover 14 is therefore retained in closed position. On movement of arm 47 to a position, such as that indicated by dotted lines in Fig. 3, the notch 48 is moved away from vertical arm 40ᵃ of the pivoted locking member, thereby permitting the horizontal arm 40 of the latter to drop out of engagement with the locking edge 39 of the fixed locking member 36 and permitting the cover 14 to open. For throwing the arm 47 to releasing position, a plunger 49 is mounted in a socket in the support 44 and pressed upwardly by a spring 50. The spring-pressed plunger engages the inner face of that end of the arm 47 which is provided with the notch 48. Mounted on the opposite end of arm 47 is a roller 51, for a purpose which will appear hereinafter.

The above described lock for the cover 14 is retained in locked position, thereby confining the indicator cylinder 16 within the chamber 5, so long as the vessel is running its normal course through the water. When, however, the motive power of the vessel is spent or fails, and the vessel submerges to a predetermined depth beneath the surface of the water, the lock is released and the cover 14 is opened, permitting the indicator cylinder to rise to the surface of the water. Thus, two conditions are essential to release the indicator cylinder: (1) failure of the motive power, and (2) submergence of the vessel to a predetermined depth beneath the surface of the water.

The invention herein resides particularly in improved mechanism controlling the indicator cylinder in the manner and for the purposes above set forth; and such control may be applied to the lock, by means of the following instrumentalities:—As shown, the cover 14 is provided with an upright cylindrical stud 52 receiving a headed pin 53, the latter being secured to the cover 14 by a suitable attaching device, such as a screw 54. Journaled beneath the head of the pin 53, and surrounding the stud 52 is a rotatable member, preferably a cylinder 55 provided with an interior chamber 56. A coil spring 57 is located within chamber 56; one end of the coil spring is secured to the cylinder 55 and the other end of the spring is secured to some relatively fixed part, such as the cover 14, as shown in Fig. 3. The roller 51 at the end of arm 47 is adapted to rest on the upper horizontal face of the cylinder 55 and thereby cause said arm 47 to be retained in position for holding the pivoted locking member 41 in locked engagement with the fixed locking member 36. Formed in the upper horizontal face of the cylinder 55 is a recess 58 adapted to receive and to be brought into registry with the roller 51 of the arm 47, on rotation of the cylinder 55 toward the right, as indicated by the arrow of Fig. 2. The spring 57 is tensioned to rotate the cylinder in this direction. When recess 58 is thus moved into registry with roller 51 arm 47 may be moved by the spring-pressed plunger to the position indicated by dotted lines in Fig. 3, thereby permitting the horizontal arm 40 of pivoted locking member to drop out of locking engagement with the locking edge 39 of the fixed locking member 36.

Movement of the cylinder 55 into the lock releasing position above set forth is prevented, while the vessel is running its normal course through the water; and such movement of the cylinder is further prevented until the vessel submerges to a predetermined depth beneath the surface of the water. Mounted on and projecting from cylinder 55 is a horizontal supporting arm 59 (Figs. 2, 4, 5 and 6) having lateral lugs 60 mutually supporting a horizontal pin 61. Mounted on a bar 62 hinged on the pin 61 is a water wing or blade 63 which is thereby adapted to assume a raised or lowered position with respect to the cover 14. The blade 63 is formed preferably of a metallic plate provided with an outer portion 64 bent at such an angle with respect to the inner portion of the blade, that the outer portion 64 will lie substantially in a vertical plane, when the blade assumes its raised position indicated in Figs. 4 and 5. The angular portion 64 of the blade is further bent at such an angle to the bars 59 and 62 that said portion 64 will lie in a plane substantially parallel with the longitudinal axis of the vessel, when the lifted blade is moved by pressure of the water into the position shown in Fig. 4. For retaining the blade 63 in raised position, the blade is provided with an inwardly-projecting extension 65 having a hole for the reception of a pin 66 mounted in the bar 59 and pressed outwardly by a spring 67 (see Fig. 6).

Mounted on the cylinder 55 and positioned thereon substantially opposite to the blade 63 is a rack 68, provided with teeth 69. Any one of the teeth 69 may be engaged by the piston 70 of a hydrostatic pressure device 71 mounted on the cover 14. The hydrostatic pressure device may be of any preferred well known type adapted to withdraw the piston 70 from a tooth of the rack 68, when the piston 70 is under a predetermined hydrostatic pressure of submergence. When the pressure of submergence is less than the maximum pressure, the latter, of course, being determined by practice, the piston 70 is advanced into position to engage a tooth. Water may enter the cylinder of the hydrostatic pressure device through holes 72 in the walls thereof. The faces of the teeth 69 are inclined outwardly in opposite directions with respect to the direction of movement of the cylinder 55 under the force of its spring 57, thereby permitting movement of the cylinder from the position shown in Fig. 2 to the position shown in Fig. 4, when the hydrostatic piston 70 is advanced, but preventing further movement of the cylinder to the position shown in Fig. 5, unless the hydrostatic piston is retracted.

Also projecting from the cylinder 55 is a stop 73 adapted to be engaged by the pin 74 of a pivoted catch 75, when the cylinder 55 and the blade 63 are in the neutral position shown in Fig. 2, this being the position which the parts occupy before the torpedo is fired. Catch 75 is provided with a spring 76 for holding the pin 74 in engagement with the stop 73, thereby preventing movement of the cylinder 55 into releasing position. When the cylinder 55 is in neutral position, the rack may be engaged by the hydrostatic piston 70, but, when the torpedo is placed in the tube, the pressure used in firing the torpedo may act to retract the hydrostatic piston, and the catch 75 prevents any possible movement of the parts to releasing position while the torpedo is being fired. A pin 77 on the catch 75 is adapted to engage a stop 78 projecting from the cover 14, and hold the catch 75 in its locking position.

Figure 4:
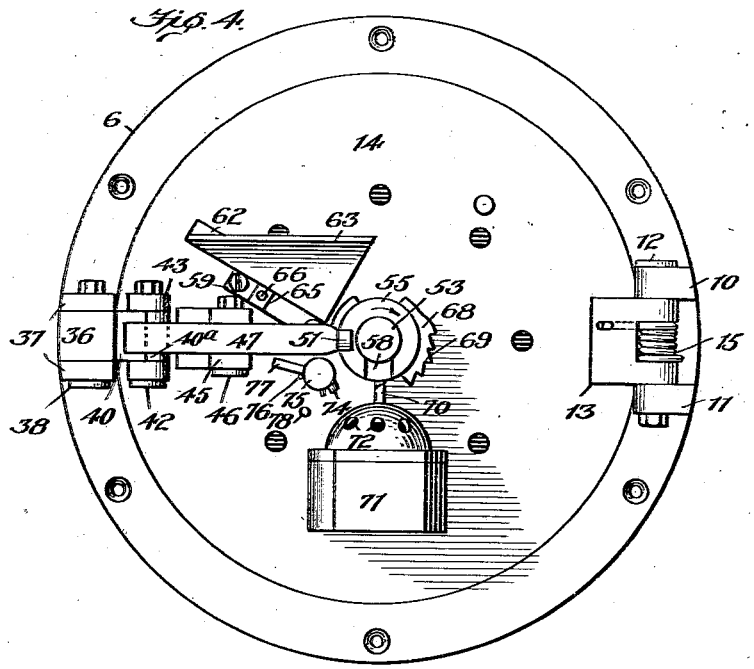
Fig. 4 is a view similar to Fig. 2, but showing the parts of the lock-controlling mechanism in the position they assume when the vessel is pursuing its normal course through the water.
Figure 5:
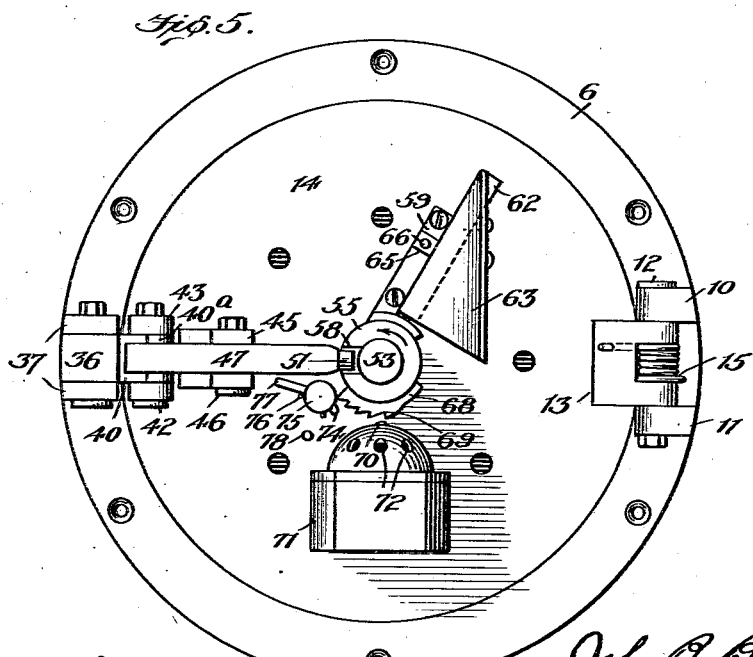
Fig. 5 is another view similar to Fig. 2, but showing the parts of the lock-controlling mechanism in lock-releasing position.

The operation of the mechanism controlling the lock for the cover 14 is as follows: Assuming that a torpedo is equipped with the indicating means and other parts above described, the cover 14 is closed and the lock therefor is set in locked position in the manner hereinbefore set forth. The parts of the controlling mechanism are adjusted so that they assume the neutral position shown in Fig. 2. In neutral position the top face of the cylinder 55 engages the roller 51 of arm 47, thereby retaining the lock in locked position, as hereinbefore set forth. The pin of catch 75 engages the stop 73 of the cylinder and prevents the spring 57 from moving the recess 58 into registry with the roller 51. The blade 63 is in lowered position beneath the skin of the torpedo head and hence will not catch in any part of the tube from which the torpedo is fired. On firing of the torpedo and when the latter starts its run through the water, the pressure of the water flow underneath the blade 63 lifts the latter into raised position, whereupon the spring-pressed plunger 66 enters the hole in extension 65, locking the blade in raised position. The pressure of the waterflow then swings the lifted blade 63 rearwardly into a position such as that shown in Fig. 4, wherein the outer portion 64 of the blade is substantially parallel with the longitudinal axis of the torpedo. Thus, practically the entire surface of the blade is in a portion so as to offer practically no resistance to the flow of the water, and is retained by the water pressure in this position, while the torpedo is running its normal course under its motive power. As a result, the blade will offer little, if any, resistance to the running of the torpedo and will not act to swerve the torpedo from its course. Movement of the wing to this position also rotates the cylinder 55 rearwardly and causes release of the catch 75, the spring of the latter moving the pin 74 out of the path of stop 73, thereby permitting the cylinder 55 to move into releasing position, at the proper time. When the torpedo has finished its run, or the motive power of the vessel fails, the pressure or resistance due to the flow of the water, which maintains the blade 63 in the position above described and shown in Fig. 4, is reduced sufficiently to permit the spring 57 to swing the blade 63 and cylinder 55 around into the position shown in Fig. 5, wherein the recess 58 of the cylinder 55 is in registry with the roller 51 on the end of the lock-controlling arm 47. This movement of the cylinder 55 will take place provided the hydrostatic piston 70 has been retracted by a predetermined hydrostatic pressure of submergence. Thus, it is essential that the motive power of the vessel be spent or fail and that the vessel submerge to a predetermined depth beneath the surface of the water before the cylinder 55 can be moved by its spring into position to bring the notch 58 into registry with the roller 51 of the lock-controlling arm. On movement of the cylinder 55 into such position, the lock-controlling arm releases in the manner hereinbefore described. The cover then opens and the indicator cylinder 16 is ejected from the chamber 5.

Figs. 7 to 9, inclusive, illustrate a modified form of controlling mechanism for the lock. As shown, supporting uprights 78' are mounted on the cover 14 and journaled in said uprights is a horizontal shaft 79. The ends of the shaft are bifurcated to receive blades or water wings 80 which are secured to the shaft on each side of the uprights 78 and are thereby adapted to oscillate on a horizontal axis from a lowered to a lifted position. Fixed to one end of the shaft 79 is a drum 81 to which is secured one end of a cord 82. The other end of the cord 82 is secured to a disk 83 slidably mounted within a cylinder 84 and engaged by a coil spring 85 surrounding that portion of the cord 82 which is within the cylinder 84. Spring 85 exerts its force on the disk 83 and cord 82 in a direction to unwind the latter from the drum 81 and rotate the shaft 79 so as to shift the wings 80 into elevated position. Fixed to the shaft 79 and centrally located thereon is a disk 86 provided with a peripheral notch 87 which is brought into registry with the roller 51 on the end of the lock-controlling arm 47, when the wings 80 are moved into elevated position. Also fixed to the shaft 79 is a second disk 88 having teeth 89 formed in its outer face, which teeth are adapted to be engaged by the piston 70 of a hydrostatic pressure device similar to that hereinbefore described. The faces of the several teeth 89 are inclined in a direction to permit lowering movement of the wings when the hydrostatic piston 70 is advanced, but to prevent lifting movement of the wings until the piston 70 has been retracted by a predetermined hydrostatic pressure.

The operation of the modified arrangement above described is as follows:—Before placing a torpedo equipped with the mechanism in the tube for firing, the wings 80 are adjusted in the lowered or substantially horizontal position in which position they are held by the hydrostatic piston 70. Should the hydrostatic piston retract because of the pressure within the tube, the wings are prevented from moving into an elevated position by the sides of the tube, without in any way interfering with the passage of the torpedo through the tube since the direction of lift of the wings is toward the mouth of the tube. While the torpedo is running its normal course under its motive power, the wings are retained in the lowered substantially horizontal position by the pressure or resistance of the water flow, and, as long as the torpedo is running, the cover 14 will remain locked and prevent escape of the indicator cylinder. In their lowered position the wings offer substantially no resistance to the passage of the torpedo. When, however, the torpedo has finished its run or the motive power fails, the pressure on the wings is reduced, permitting rotation of the shaft 79 by the spring 85 to shift the wings into elevated position. Rotary movement of the shaft by the spring is effected when the hydrostatic piston retracts, on submergence of the torpedo to a predetermined depth beneath the surface of the water, and such rotary movement brings the notch 87 into registry with the roller 51 on the lock-controlling arm 14, whereupon the latter drops into lock-releasing position and escape of the indicator cylinder is effected.

What is claimed is:—

1. In combination with a torpedo, a releasable indicating means therefor, a releasable lock for retaining said indicating means on the torpedo, a water wing controlling said lock and movable by the water pressure while the torpedo is running its normal course into a position substantially non-resistant to the passage of the torpedo through the water, in which position of the water wing the lock is retained closed, and means operable upon a reduction in pressure on the wing for moving the latter into a lock-releasing position.

2. In combination with a torpedo, a releasable indicating means therefor, a releasable lock for retaining said indicating means on the torpedo, a water wing controlling said lock and movable by the water pressure while the torpedo is running its normal course into a position substantially non-resistant to the passage of the torpedo through the water, in which position of the water wing the lock is retained closed, means operable upon a reduction in pressure on the wing for moving the latter into a lock-releasing position, and means releasable upon a predetermined hydrostatic pressure of submergence for preventing movement of the water wing into lock-releasing position.

3. In combination with a torpedo, a releasable indicating means therefor, a releasable lock for retaining said indicating means on the torpedo, a water wing controlling said lock and movable by the water pressure while the torpedo is running its normal course, into a position substantially parallel with respect to the line of motion of the torpedo, in which position of the water wing the lock is retained closed, and means operable upon a reduction in pressure on the water wing for moving the latter into a lock-releasing position.

4. In combination with a torpedo, a releasable indicating means therefor, a releasable lock for retaining said indicating means on the torpedo, a water wing controlling said lock and movable by the water pressure while the torpedo is running, from a first position into a second position substantially parallel with respect to the line of motion of the torpedo, in which second position of the water wing, the lock is retained closed, means operable upon a reduction in pressure on the water wing for moving the latter into a third lock-releasing position, and means for preventing movement of the water wing from its first position directly to its third position.

5. In combination with a torpedo, a releasable indicating means therefor, a releasable lock for retaining said indicating means on the torpedo, a water wing controlling said lock and movable by the water pressure while the torpedo is running, from a first position into a second position substantially parallel with respect to the line of motion of the torpedo, in which second position of the water wing, the lock is retained closed, means operable upon a reduction in pressure on the water wing for moving the latter into a third lock-releasing position, and a spring-actuated locking means for preventing movement of the wing from its first position directly to its third position, said locking means releasable on movement of the water wing from its first to its second position whereby the wing may move from its second to its third position.

6. In combination with a torpedo, a releasable indicating means therefor, a releasable lock for retaining said indicating means on the torpedo, a water wing controlling said lock and pivoted on vertical and horizontal axes with respect to the torpedo, whereby the wing may move on its horizontal axis from a lowered to a lifted position, and may move on its vertical axis into three positions, said wing movable on its horizontal axis from a lowered position to a lifted position and on its vertical axis from a first position into a second position by the water pressure while the torpedo is running its normal course, in which second position of the water wing the lock is retained closed, means for locking the wing in lifted position, and means operable upon a reduction in pressure on the lifted wing for moving the latter into a third lock-releasing position.

7. In combination with a torpedo, a releasable indicating means therefor, a releasable lock for retaining said indicating means on the torpedo, a lock controlling arm movable into lock-releasing position, a rotatable member for preventing movement of the arm into lock-releasing position and provided with a recess adapted to permit movement of the arm into lock-releasing position, a spring for moving said rotatable member into position to bring the recess into registry with the arm, a water wing mounted on the rotatable member for moving the recess out of registry with the arm, said water wing movable by the water pressure while the torpedo is running its normal course into a position substantially non-resistant to the passage of the torpedo through the water, and means releasable upon a predetermined hydrostatic pressure of submergence for preventing movement of the rotatable member into position to bring the recess into registry with said arm.

8. In combination with a torpedo, a releasable indicating means therefor, a releasable lock for retaining said indicating means on the torpedo, a lock-controlling arm movable into lock releasing position, a member rotatable on a horizontal axis for preventing movement of the arm into lock-releasing position and provided with a recess adapted to permit movement of the arm into lock-releasing position, spring means for moving said rotatable member into position to bring the recess into registry with the arm, a water wing mounted on the rotatable member for moving the recess out of registry with the arm, said water wing movable on a horizontal axis by the water pressure while the torpedo is running its normal course, into a substantially horizontal position relatively to the longitudinal axis of the torpedo, and means releasable upon a predetermined hydrostatic pressure of submergence for preventing movement of the rotatable member into position to bring the recess into registry with said arm.

9. In combination with a torpedo, a releasable indicating means therefor, a releasable lock for retaining said indicating means on the torpedo, a water wing controlling said lock and movable by the water pressure while the torpedo is running from a first position into a second position in which the lock is retained closed, means operable upon a reduction in pressure on the water wing for moving the latter into a third lock-releasing position, and means for preventing movement of the water wing from its first position directly to its third position.

10. In combination with a torpedo, a releasable indicating means therefor, a releasable lock for retaining said indicating means on the torpedo, a water wing controlling said lock and movable by the water pressure while the torpedo is running from a first position into a second position in which the lock is retained closed, means operable upon a reduction in pressure on the water wing for moving the latter into a third lock-releasing position, and a spring-actuated locking means for preventing movement of the wing from its first position directly to its third position, said locking means releasable on movement of the water wing from its first to its second position, whereby the wing may move from its second to its third position.

JOHN B. BARRETT.